United States Patent Office

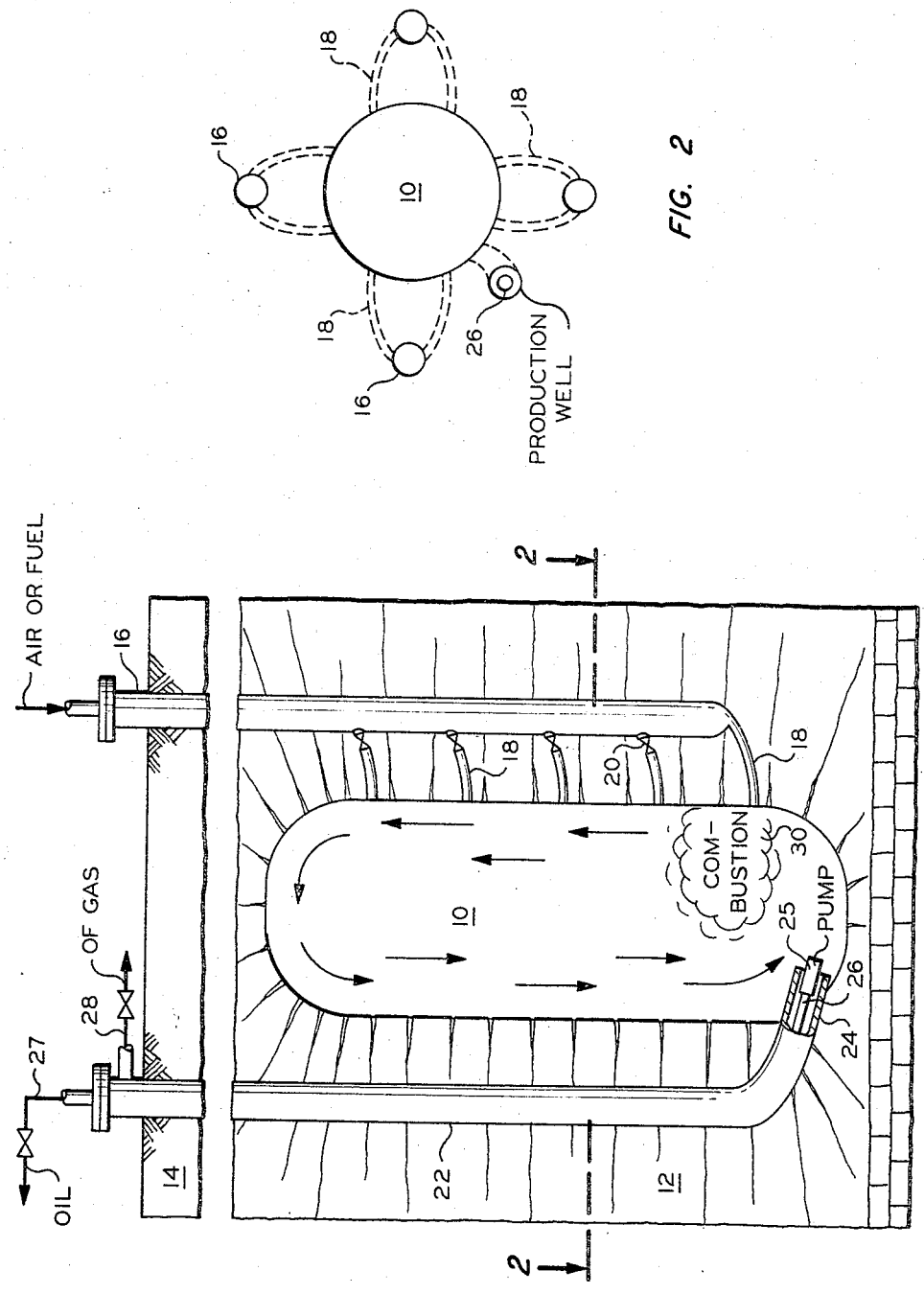

3,490,529
Patented Jan. 20, 1970

3,490,529
PRODUCTION OF OIL FROM A NUCLEAR
CHIMNEY IN AN OIL SHALE BY IN SITU
COMBUSTION
Harry W. Parker, Bartlesville, Okla., assignor to Phillips
Petroleum Company, a corporation of Delaware
Filed May 18, 1967, Ser. No. 639,490
Int. Cl. E21b 43/24, 43/26
U.S. Cl. 166—256                                    7 Claims

ABSTRACT OF THE DISCLOSURE

A nuclear chimney in an oil shale is produced by direct drive in situ combustion from one or more wells outside and adjacent the chimney by providing passageways from the well(s) into the chimney, optionally, at different levels, igniting the shale thru said well(s), driving the resulting combustion zone(s) thru said shale, and recovering oil in liquid and vapor form to a production well communicating with the bottom of the chimney. This displaces cool gases from the upper portion of the chimney with hot gases from the combustion zone, thereby retorting the shale in the chimney above the combustion zone(s).

---

This invention is concerned with a novel process for producing shale oil from a nuclear chimney in a bed of oil shale, utilizing in situ combustion and retorting with resulting hot gases.

A number of projects by the Government and by private industry are currently directed toward the production of shale oil from oil shale deposits by creating a nuclear chimney in the oil shale by means of a nuclear explosion to fragment the oil shale so that it is amenable to production by retorting, in situ combustion, etc. It is estimated that a nuclear explosion in oil shale will create a chimney of rubble 600 to 800 feet in diameter and 1400 or 1500 feet in height, depending upon the size of the nuclear explosion, of course. In methods so far considered for the recovery of shale oil from a nuclear chimney in an oil shale, convection currents within the chimney have been regarded as a potential problem. This invention is directed to a method of burning and retorting oil shale in a nuclear chimney which takes advantage of convection currents formed therein.

Accordingly, it is an object of the invention to provide an improved process for producing shale oil from oil shale in a nuclear chimney. Another object is to provide a method of producing oil from a fragmented oil shale in a nuclear chimney which utilizes in situ combustion and convection currents advantageously. A further object is to provide an oil shale production method which avoids recycling of produced gases and the substantial compression cost involved in such recycling.

Other objects of the invention will become apparent to one skilled in the art upon consideration of the accompanying disclosure.

A broad aspect of the invention comprises providing at least one upright injection well outwardly adjacent the cylindrical periphery of a nuclear chimney in an oil shale and at least one passageway into the chimney from the injection well at one or more levels therein below the upper ¼ of the chimney, providing at least one production well spaced substantially from said injection well and outwardly adjacent said chimney, at least one passageway from an area of said chimney adjacent its bottom to the production well, and a tubing string in said production well having a pump on its lower end within the passageway leading to the production well; igniting the shale in the chimney adjacent a passageway leading into the chimney from the injection well and injecting air thru said injection well into the ignited area so as to advance a combustion zone thru the fragmented shale; passing combustion gases and oil vapors created in the combustion zone upwardly and then downwardly thru the chimney to the passageway leading into the production well, thereby retorting a substantial portion of the shale in the upper section of the chimney; and pumping oil collecting in the bottom of the chimney thru the production well to recover the oil. Either a single combustion zone or a plurality of combustion zones are established at a selected level or levels of the chimney by providing a plurality of injection wells, each communicating with the selected level of the chimney thru passages provided, by igniting the shale adjacent the passageways and injecting air thru the injection well or wells to advance the resulting combustion zone or zones thru the fragmented shale in the chimney. It is preferred to initiate the combustion in the fragmented shale at an upper level of the nuclear chimney in order to minimize drainage of liquid oil into the combustion zone and form a more stable shale residue. The resulting combustion zone moves downwardly and hot gases developed in the combustion zone rise thru the shale along one side of the chimney, displacing cool gas from the spaces between the fragmented shale so as to gradually increase the temperature of the shale in the path of the hot gases and effect retorting of the shale in the upper section of the chimney. The cooled displaced gases descend the opposite side of the chimney and pass thru the passageway into the production well and are recovered from the annulus of this well at the wellhead. After retorting has progressed for a substantial period, there are valuable oil vapors in the gases emanating from the well annulus and these are recovered as a portion of the produced shale oil.

In another embodiment of the invention, a plurality of injection wells connected with the nuclear chimney thru passageways at selected levels are utilized and a combustion zone is established in the fragmented shale adjacent each of the injection wells so that hot gases from the several combustion zones rise along the outer periphery of the chimney and the displaced cooled gases descend the axial area of the chimney to the outlet passageway leading to the production well.

In another embodiment of the invention, passageways are created at different levels from one or more injection wells into the nuclear chimney for the purpose of igniting the fragmented shale at different levels either simultaneously or sequentially. These passageways at different levels are then utilized to establish combustion zones in the shale at different levels in order to increase the rate of production of oil and retorting of the shale above the combustion zones. Further, since it is desirable to maintain the retorting temperature at about 850 to 1000° F., the passageways at the different levels may be utilized for cool gas injection to control the temperature of the retorting gas.

The passageways from the injection and production wells into the nuclear chimney may be formed by drilling, mining, or by fracturing and propping. In some cases, fractures produced by the nuclear explosion can be utilized as the required passageways. Fractures other than those which are to be utilized in the process are sealed off in conventional manner by plugging. Propping of the fractures may be resorted to in order to increase the flow of gases into the chimney.

In providing ignition of the fragmented shale at different levels, individual wells may be drilled to different depths or surface operated valves may be placed along the well so as to facilitate the injection of air at different levels or depths.

A more complete understanding of the invention may be had by reference to the accompanying schematic drawing of which FIGURE 1 is an elevation thru a nuclear chimney in an oil shale with wells connecting with the chimney for operation of the process; and FIGURE 2 is a plan view taken along the line 2—2 of FIGURE 1.

Referring to the drawing, a nuclear chimney 10 is formed in an oil shale 12 subjacent an overburden 14. Chimney 10 is substantially filled with fragmented shale not shown. One or more injection wells 16 are drilled outside the periphery of chimney 10 and connected therewith by passageways 18 which may be provided with valves 20. The lowermost passageway 18 leads into the chimney near the bottom thereof. A production well 22 is similarly drilled and is connected by passageway 24 with the lowermost section of the chimney. This production well is cased and provided with a tubing string 26 and a pump, such as Reda pump 25, on the lower end of the string. This arrangement provides means for removing oil thru line 27. Off-gas from the well annulus is removed thru line 28.

FIGURE 2 shows four injection wells 16 each connected with the nuclear chimney thru passageways 18. Production well 22 is shown intermediate a pair of injection wells.

One method of operation comprises injecting air thru well 16 and thru the lowermost passageway 18 with the other passageways closed and igniting the fragmented shale adjacent this lowermost passageway so as to establish a combustion zone in the fragmented shale. Continuing the injection of air feeds the combustion zone and advances the same into the shale, causing expansion thereof principally upwardly and inwardly. The hot gases produced in the combustion zone rise along the periphery of the chimney above the combustion zone so as to displace cooler gas in the interstices of the fragmented shale, thereby increasing the temperature of the shale to a level of 850 to 1000° F., preferably, the retorting the fragmented shale in the upper section of the chimney. Due to convection, the hottest gases in the chimney eventually fill the uppermost portion of the chimney and this mass of hot gas is increased so as to advance the level thereof downwardly thru the shale. As the shale above the combustion zone is retorted, coke is left therein and the combustion zone ascends the chimney, feeding on the residual coke left by the retorting phase of the operation. For a major portion of the chimney retorting time, gases produced from the shale circulate within the chimney, mixing with the injected air and are burned as fuel.

Liquid oil produced by the combustion and by the retorting phases of the operation collects in the bottom of the chimney and is recovered thru line 26 by operation of the pump 25. Off-gases forced thru the annulus of well 22, including oil vapors, are recovered thru line 28 and processed for recovery of oil therefrom.

Control of the rising hot retorting gas temperature is achieved by several variables including the position and number of air injection points, average air injection rate, and chimney operating pressure. Initially, the shale above the combustion zone is retorted until the column of hot gases reaches the top of the chimney. These hot gases then accumulate at the top of the chimney to retort the remainder of the fragmented shale from the top of the chimney down.

It is also feasible to inject a small amount of fuel gas such as natural gas in the injected air. This procedure furnishes heat to the retorting operation without burning shale oil for the added heat benefit.

Ignition of the fragmented shale may be effected in any suitable manner known to the in situ combustion art. One method comprises burning a mass of charcoal impregnated with a heavy oil, such as diesel oil, in the lower end of the injection well and particularly in the passageway leading into the chimney. Ignition may also be effected by injecting a mass of autoignitable fuel adsorbed in and on particulate porous refractory material or charcoal in the ignition area. Also, a burner downhole or direct injection of hot air may be used. However, the invention is not dependent upon the ignition method used.

Operation with more than one combustion zone either at the same level from different injection wells or at different levels adjacent one or more injection wells is effected in a similar manner. Generally, the combustion zones are limited to initiation in the lower half of the chimney.

Control of the combustion and retorting temperature is facilitated by the use of conventional temperature sensing devices positioned in the retorting and combustion zones thru the well utilized in setting off the nuclear explosion or thru wells drilled especially for this purpose.

Certain modifications of the invention will become apparent to those skilled in the art and the illustrative details disclosed are not to be construed as imposing unnecessary limitations on the invention.

I claim:
1. A process for producing shale oil from oil shale in a nuclear chimney which comprises the steps of:
 (a) providing at least one upright injection well outwardly adjacent the cylindrical periphery of said chimney and at least one passageway into said chimney from said well at a level therein intermediate the bottom and the upper ¼ of said chimney;
 (b) providing at least one production well spaced substantially from said injection well and outwardly adjacent said chimney, at least one passageway from an area in the lowermost section of said chimney to said production well, and a tubing string having a pump on its lower end adjacent said passageway;
 (c) igniting the shale in said chimney adjacent said passageway of step (a) and injecting air thru said injection well into the ignited area so as to advance a combustion zone thru said shale;
 (d) passing combustion gases and oil vapors created by step (c) upwardly and then downwardly thru said chimney to said passageway of step (b) into said production well, thereby retorting a substantial portion of the shale in the upper section of said chimney;
 (e) operating said pump to pump oil formed by steps (c) and (d) from the bottom of said chimney thru said production well; and
 (f) recovering the oil vapors and oil from steps (d) and (e) respectively.

2. The process of claim 1 wherein a plurality of passageways at spaced-apart levels are provided in step (a), said shale is ignited at a plurality of levels, and air is injected in each ignited area in step (c) to burn said shale at each said level.

3. The process of claim 2 wherein the igniting and burning is effected sequentially, starting at a lower level in said chimney.

4. The process of claim 2 wherein the igniting and burning is effected sequentially starting at an upper level in said chimney.

5. The process of claim 1 wherein a plurality of injection wells each having a passageway into said chimney, are provided in step (a), and ignition and burning in step (c) are effected thru each of said wells.

6. The process of claim 5 wherein a plurality of passageways at spaced-apart levels are provided in each well in step (a) and ignition and burning are effected at each said level, sequentially, starting adjacent the bottom of said chimney.

7. The process of claim 4 wherein a plurality of passageways at spaced-apart levels are provided in each well in step (a) and ignition and burning are effected at each said level, sequentially, starting at an upper level of said chimney.

References Cited

UNITED STATES PATENTS

| | | | |
|---|---|---|---|
| 3,316,020 | 4/1967 | Bergstrom | 166—11 X |
| 3,233,668 | 2/1966 | Hamilton et al. | 166—11 X |
| 3,342,257 | 9/1967 | Jacobs et al. | 166—11 |
| 3,346,044 | 10/1967 | Slusser | 166—11 X |

OTHER REFERENCES

Lombard, "Recovering Oil From Shale With Nuclear Explosives," Journal of Petroleum Technology, vol. XVII, No. 8, August 1965, (pp. 877–882).

STEPHEN J. NOVOSAD, Primary Examiner

U.S. Cl. X.R.

166—269, 272, 247

UNITED STATES PATENT OFFICE
CERTIFICATE OF CORRECTION

Patent No. 3,490,529                          Dated January 20, 1970

Inventor(s)  Harry W. Parker

It is certified that error appears in the above-identified patent and that said Letters Patent are hereby corrected as shown below:

Column 5, line 6, delete the numeral "4" and insert therefor -- 5 --.

Signed and sealed this 23rd day of June 1970.

(SEAL)
Attest:

EDWARD M. FLETCHER, JR.                WILLIAM E. SCHUYLER, JR.
Attesting Officer                      Commissioner of Patents